(12) United States Patent
Chuang

(10) Patent No.: US 6,810,450 B2
(45) Date of Patent: Oct. 26, 2004

(54) PERSONAL DIGITAL ASSISTANT SYSTEM

(75) Inventor: Ko-Chien Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 114 days.

(21) Appl. No.: 10/063,885

(22) Filed: May 21, 2002

(65) Prior Publication Data

US 2003/0154334 A1 Aug. 14, 2003

(30) Foreign Application Priority Data

Feb. 8, 2002 (TW) ........................................ 91102553 A

(51) Int. Cl.⁷ ............................................. G06F 13/00
(52) U.S. Cl. ............................ 710/62; 710/72; 455/572
(58) Field of Search .............................. 710/62, 72, 2; 455/572, 575.1, 556.2; 361/737; 439/946

(56) References Cited

U.S. PATENT DOCUMENTS

| | | | | |
|---|---|---|---|---|
| 5,841,424 A | * | 11/1998 | Kikinis | ........................ 345/168 |
| 5,996,074 A | * | 11/1999 | Houck et al. | .................... 713/2 |
| 6,119,179 A | * | 9/2000 | Whitridge et al. | ............. 710/72 |
| 6,274,266 B1 | * | 8/2001 | Wang | .......................... 429/163 |
| 6,424,369 B1 | * | 7/2002 | Adair et al. | .................... 348/76 |
| 6,599,147 B1 | * | 7/2003 | Mills et al. | .................. 439/377 |
| 6,694,428 B2 | * | 2/2004 | Lemke et al. | ................... 713/1 |

* cited by examiner

Primary Examiner—Rehana Perveen
(74) Attorney, Agent, or Firm—Winston Hsu

(57) ABSTRACT

A personal digital assistant system includes a cradle, a personal digital assistant, and a peripheral module. The cradle includes a cradle housing, and a first socket positioned on the cradle housing for outputting electric power. The personal digital assistant includes a first connecting port electrically connected to the first socket of the cradle. The peripheral module is positioned on the cradle and electrically connected to the personal digital assistant and the cradle. The personal digital assistant electrically connected to the peripheral module controls the peripheral module when the personal digital assistant and the peripheral module are electrically connected to the cradle through the first socket. The cradle provides the personal digital assistant and the peripheral module with electric power through the first socket.

3 Claims, 8 Drawing Sheets

PERSONAL DIGITAL ASSISTANT SYSTEM

BACKGROUND OF INVENTION

1. Field of the Invention

The present invention relates to a composing personal digital assistant system, and more particularly, to a composing personal digital assistant system with a peripheral module.

2. Description of the Prior Art

PDAs (Personal Digital Assistants) are portable and popular computer systems. The PDAs provide functions of trip management, data processing, and so on. Compared with desktop computers or notebook computers, the PDAs are lighter and smaller. The PDAs are easily taken along so that users can use the PDAs to process data anytime. The PDAs are especially convenient for sales and product managements. However, since volumes of the PDAs are small, many functions cannot be built into the PDAs. When users want to extend the functions of the PDAs, users must connect to other external devices so as to extend their functions. Therefore, making connection to other peripheral devices is important for the PDAs.

The general PDAs always have several connecting ports for electrically connecting to other peripheral devices. There are many kinds of connecting ports, but generally, the PDAs always have one extension port and one cradle port. The extension port is always posited on an upper side of the PDA for receiving a function-adding add-on card so as to extend the function of the PDA. The PDA also can electrically connect to other peripheral devices through the add-on card. The cradle port is used to fix the PDA on a cradle and electrically connects the PDA to the cradle. When the PDA is fixed on the cradle, users can operate the PDA more conveniently. In addition, the PDA can electrically connect to an external power source through the cradle so that the PDA can be charged.

Please refer to FIG. 1. FIG. 1 is a perspective view of a prior art PDA 10. As shown in FIG. 1, The PDA 10 includes a square housing 14 with a touch panel 16 and a plurality of buttons 18. Users control the PDA 10 by input instructions through the touch panel 16 and the buttons 18. The touch panel 16 also can display images so that users can watch data. The PDA 10 includes an extension port 20 formed on an upper side of the PDA, and a cradle port 22 formed on a lower side of the PDA. The extension port is used to receive an extension card 12 so that the function of the PDA can be extended. The cradle port 22 is used to connect the PDA with a cradle.

Please refer to FIG. 2. FIG. 2 is a perspective view of a prior art cradle 30. The cradle 30 includes a cradle housing 32 with a socket 34. The socket 34 corresponds to the cradle port 22 of the PDA 10. The PDA 10 can electrically connect to the cradle 30 by inserting the socket 34 into the cradle port 22. The cradle 30 further includes an inner control circuit (not shown) installed inside the cradle housing 32. The inner control circuit is used to transform an external alternating current 36 into a direct current and output the direct current to the PDA 10 through the socket 34 and the cradle port 22 so as to charge the PDA 10.

Because of the limitation of the volume, the PDAs always have one extension port only. Therefore, it is inconvenient when users want to simultaneously use more than one function. In addition, there are many different kinds of add-on cards, such as CF cards, SmartMedia cards, SD cards, MultiMedia cards, and so on. Moreover, these add-on cards do not have uniform standards. Each different brand PDA also has a different standard of extension port. Therefore, each user of the PDA must prepare the suitable add-on card. For example, each user of the different kind PDA needs to prepare a specific add-on card to connect to a projector in a conference. This is inconvenient for users. In addition, the prior art cradle can only provide the electric power to the PDA, but cannot provide a function-adding channel. Therefore, the prior art PDA can only have one add-on card inserted. This is inconvenient for users.

SUMMARY OF INVENTION

It is therefore a primary objective of the claimed invention to provide a composing PDA (Personal Digital Assistant) system, in which a cradle of the PDA system can connect with a peripheral module so as to extend functions of the PDA.

The claimed invention, briefly summarized, discloses a composing PDA system. The composing PDA system includes a cradle, a PDA, and a peripheral module. The cradle includes a cradle housing, a first socket, a second socket connected to the first socket and installed on the cradle housing, and a power conversion device for transforming an external alternating current into a direct current and outputting the direct current through the first and second socket. The PDA includes a first housing, a computer circuit, a touch panel, and a first connecting port. The first connecting port is formed on a lower side of the first housing and electrically connected to the computer circuit, for electrically connecting to the first socket of the cradle. The first housing of the PDA can be fixed on the cradle through connecting the first connecting port to the first socket. The peripheral module includes a second housing, a peripheral circuit installed inside the second housing for providing a peripheral function, and a second connecting port installed on the second housing and electrically connected to the peripheral circuit, for electrically connecting to the second socket of the cradle. The second housing of the peripheral module can be fixed on the cradle through connecting the second connecting port to the second socket. When the PDA and the peripheral module are installed on the first and second socket of the cradle through the first and second connecting port, respectively, the PDA can electrically connect to the peripheral module through the cradle so as to control operations of the peripheral module. The power conversion device of the cradle provides the direct current to the PDA and the peripheral module through the first and second socket.

It is an advantage of the claimed invention that the claimed invention includes a peripheral module which can be installed on the cradle. The PDA can electrically connect to the peripheral module through the cradle, and can further electrically connect to other peripheral devices through the peripheral module. Thus, the PDA is more convenient to use. In addition, the claimed invention composing PDA system has wide flexibility. The manufacturers need not to design and produce the PDA and the cradle again, and the cost can be decreased if users use the claimed invention composing PDA system to extend the function of the PDA.

These and other objectives of the claimed invention will no doubt become obvious to those of ordinary skill in the art after reading the following detailed description of the preferred embodiment which is illustrated in the various figures and drawings.

DETAILED DESCRIPTION

Figure 1:
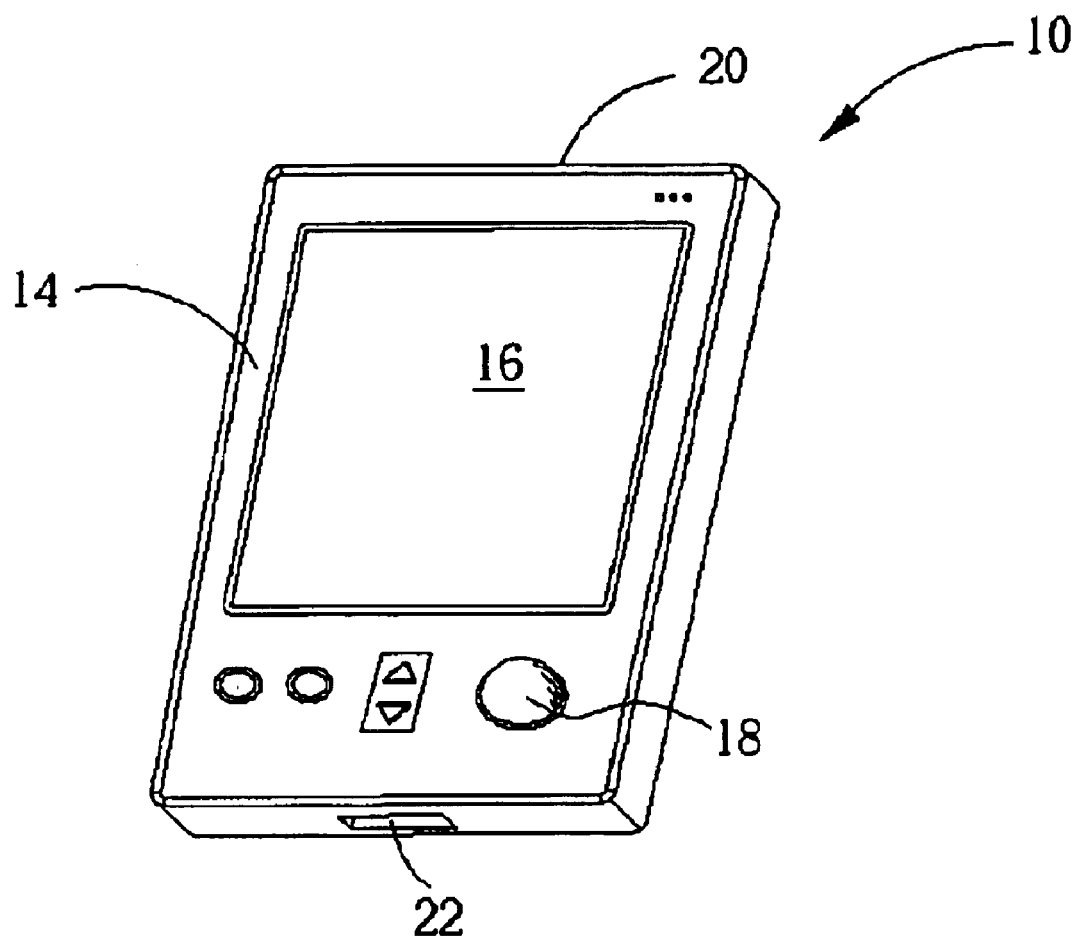
FIG. 1 is a perspective view of a prior art PDA.
Figure 2:
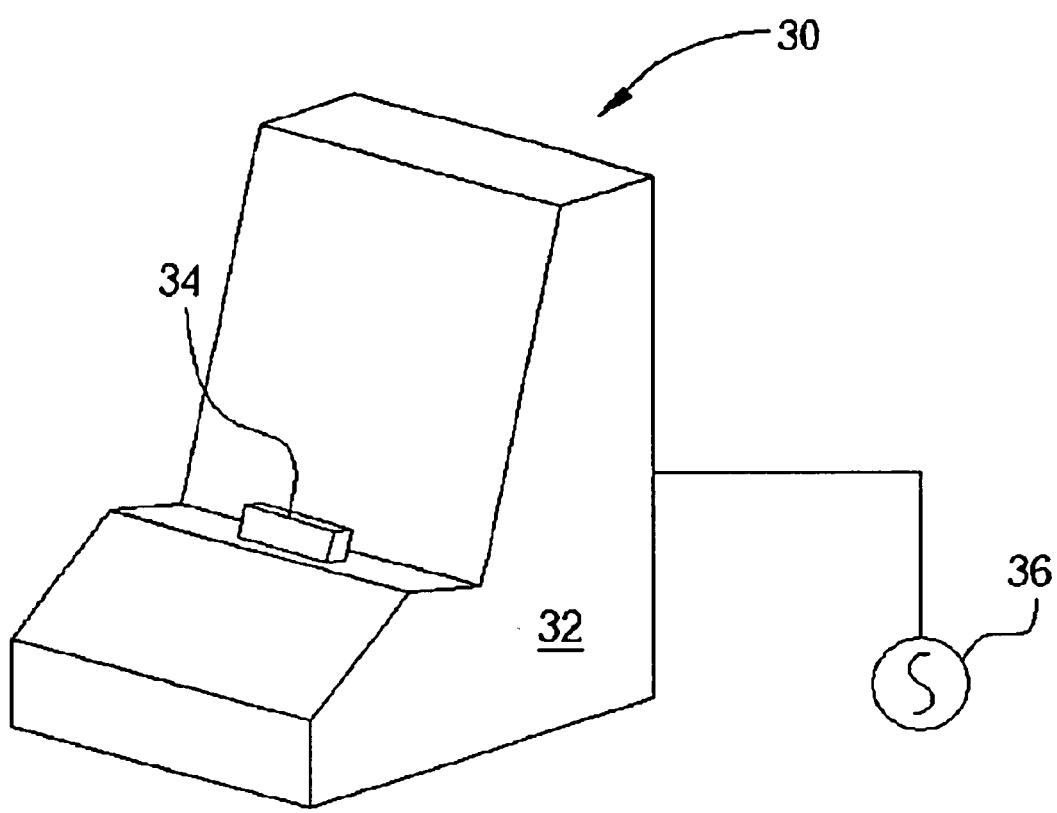
FIG. 2 is a perspective view of a prior art cradle.
Figure 3:
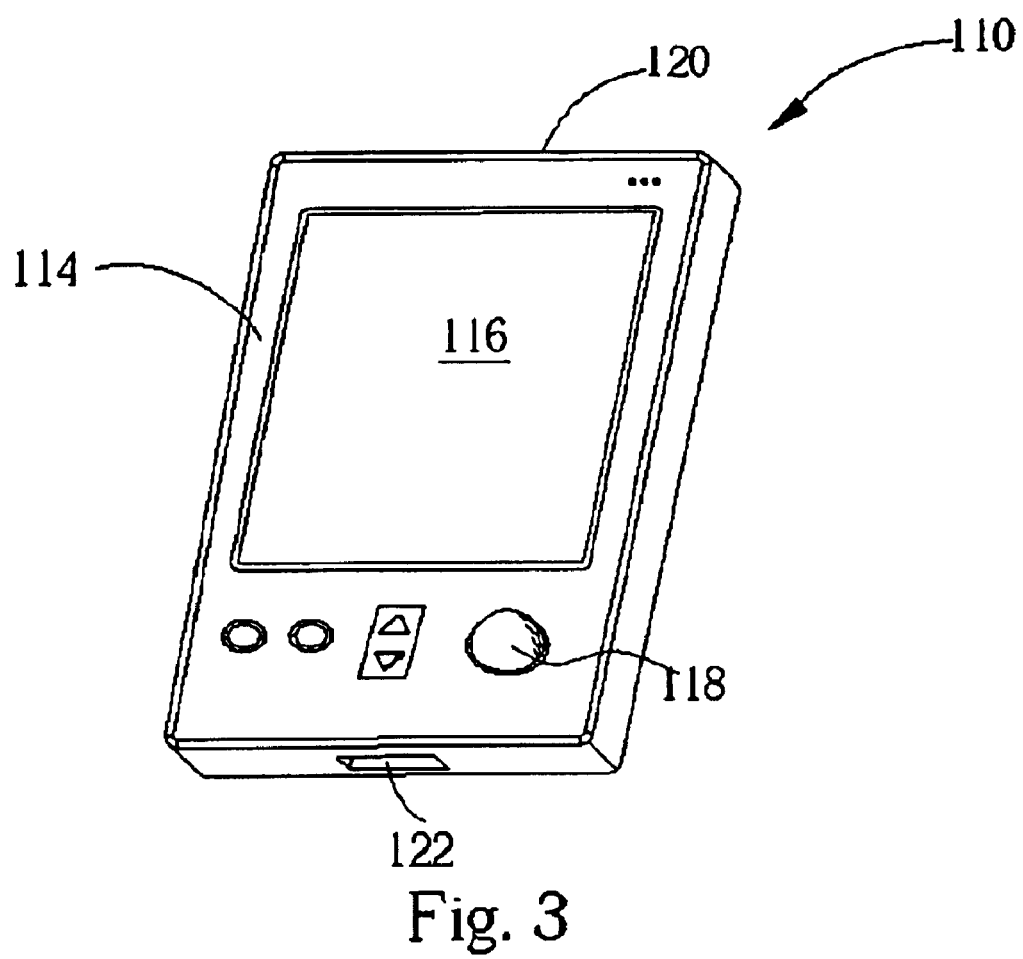
FIG. 3 is a perspective view of a PDA of the present invention composing PDA system.

The present invention composing PDA (Personal Digital Computer) system includes a PDA, a cradle, and a peripheral module. Please refer to FIG. 3. FIG. 3 is a perspective view of a PDA 110 of the present invention composing PDA system. The PDA 110 has a square housing 114. A computer circuit (not shown) is installed inside the housing 114. The computer circuit includes a processor and a memory for processing data. The housing 114 of the PDA 110 includes a touch panel 116 and a plurality of buttons 118 installed on a front side of the PDA 110. The touch panel 116 and the buttons 118 are electrically connected to the computer circuit so that users can control the operation of the PDA 110 by inputting instructions through the touch panel 116 and the buttons 118. The touch panel 116 also can display images so that users can watch data and the operation status of the PDA 110. The PDA 110 further includes a first connecting port 122 formed on a lower side of the PDA 110 for electrically connecting to a cradle.

Figure 4:
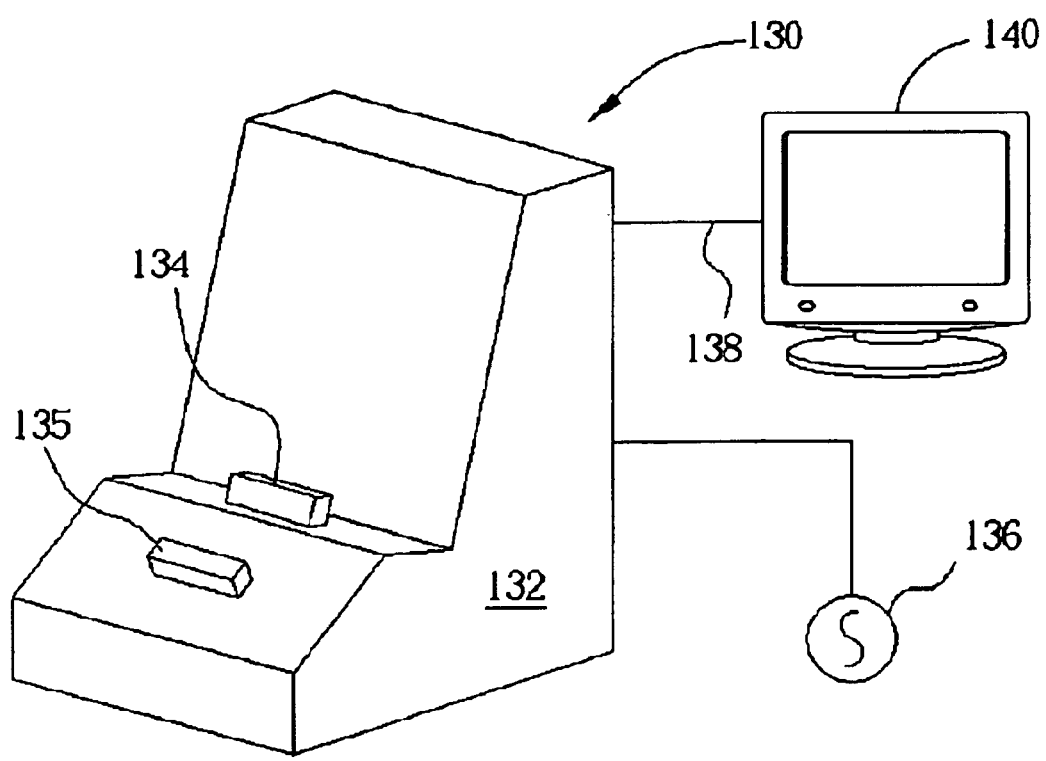
FIG. 4 is a perspective view of a present invention cradle.

Please refer to FIG. 4. FIG. 4 is a perspective view of the present invention cradle 130. The cradle 130 has a cradle housing 132. A first socket 134 and a second socket 135 are installed on the cradle housing 132. The first socket 134 corresponds to the first connecting port 122 of the PDA 110. The PDA 110 can be fixed on the cradle 130 by connecting the first connecting port 122 to the first socket 134. When the PDA 110 is disposed on the cradle 130, the PDA 110 also electrically connects to the cradle 130. The cradle 130 further includes an internal control circuit installed inside the cradle housing 132. The control circuit electrically connects the first socket 134 to the second socket 135. The control circuit has a current conversion device for transforming an external alternating current 136 into a direct current and outputting the direct current through the first socket 134 and the second socket 135. In addition, the internal control circuit can electrically connect to a personal computer 140 through a transmission line 138. Therefore, the PDA 110 installed on the cradle 130 can transmit data to the personal computer 140 or receive data from the personal computer 140 through the cradle 130.

Figure 5:
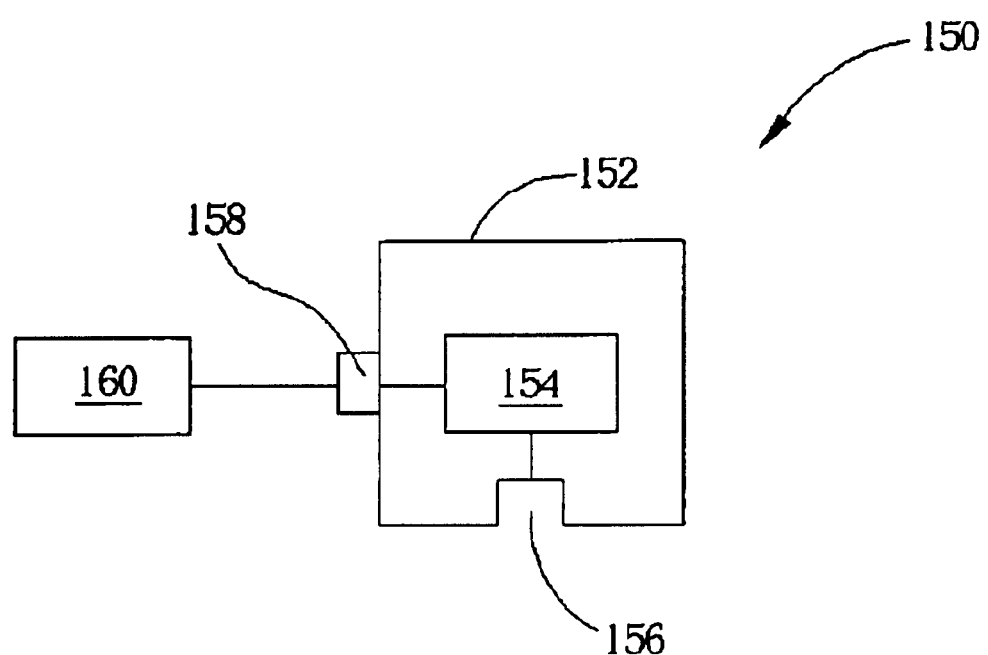
FIG. 5 is a perspective view of a peripheral module of the present invention composing PDA system.

Please refer to FIG. 5. FIG. 5 is a perspective view of the peripheral module 150 of the present invention composing PDA system. The peripheral module 150 includes a housing 152, a peripheral circuit 154 installed inside the housing 152 for providing a peripheral function, and a second connecting port 156 formed on the housing 152 and electrically connected to the peripheral circuit 154. The peripheral circuit 154 has an input/output port 158 disposed on the housing 152 for electrically connecting to a peripheral device 160. For example, the peripheral module 150 can be a VGA (video graphic array) module with a VGA output port. The VGA output port of the VGA module can electrically connect to a peripheral device 160 that can receive the VGA signals, such as a display screen. Please notice that the present invention peripheral module 150 is not limited to any specific functional module. The present invention peripheral module 150 can be formed by any peripheral device or input/output conversion device that can connect to the PDA. For example, the peripheral module 150 can be a USB (universal serial bus) module with a USB input/output port for transmitting USB signals, a network transmission module with a network input/output port for transmitting network signals, or a keyboard module with a plurality of keys for generating keyboard signals.

Figure 6:
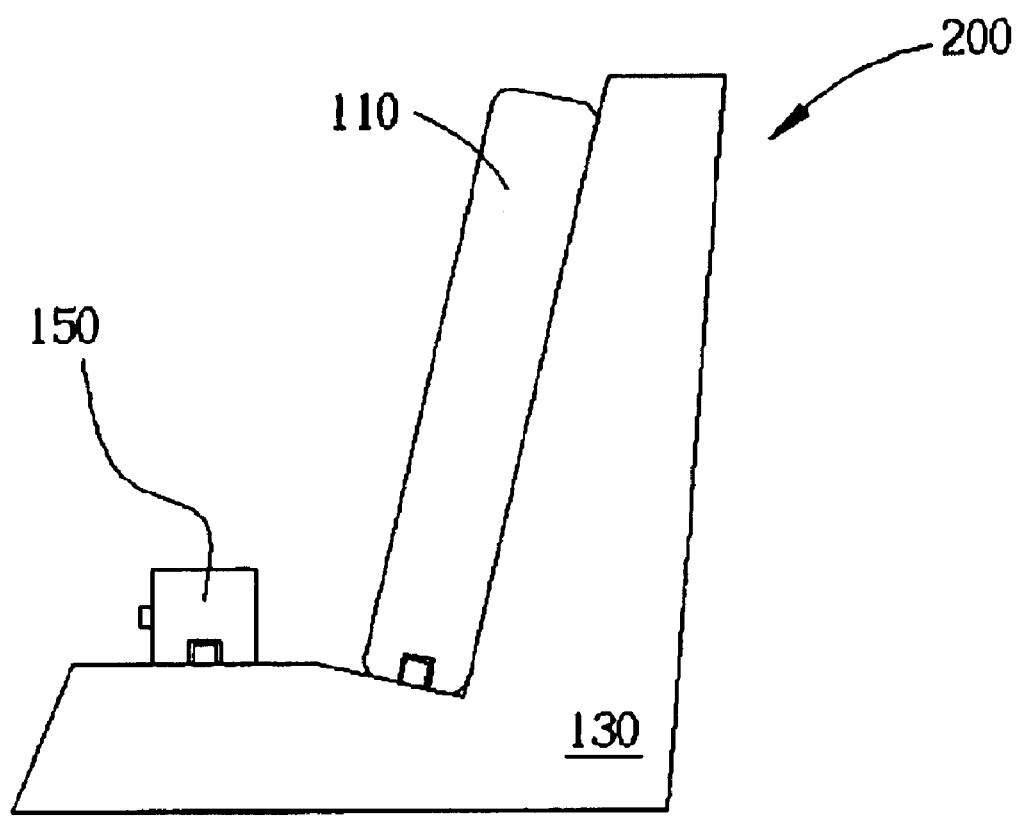
FIG. 6 is a perspective view of a first embodiment of the present invention composing PDA system.

Please refer to FIG. 6. FIG. 6 is a perspective view of the first embodiment of the present invention composing PDA system 200. The composing PDA system 200 includes the PDA 110, the cradle 130, and a peripheral module 150. The PDA 110 and the peripheral module 150 are installed on the cradle 130. The first connecting port 122 of the PDA 110 electrically connects to the first socket 134 of the cradle 130. The second connecting port 156 of the peripheral module 150 electrically connects to the second socket 135 of the cradle 130. Therefore, the PDA 110 can electrically connect to the peripheral module 150 through the cradle 130. The function of the PDA 110 can be extended through the peripheral circuit 154 of the peripheral module 150.

In the present invention composing PDA system 200, users can install suitable peripheral modules onto the cradle 130 according to personal demands. For example, when users use the PDA 110 to perform a briefing, users can connect the PDA 110 to the peripheral module 150 with the VGA output port 154, and connect the VGA output port 154 to the peripheral device 160 that can receive the VGA signal, such as the display screen. Therefore, the VGA signals generated by the PDA 110 can be transmitted to the display screen through the peripheral module 150. The display screen displays the image corresponding to the VGA signals.

Figure 7:
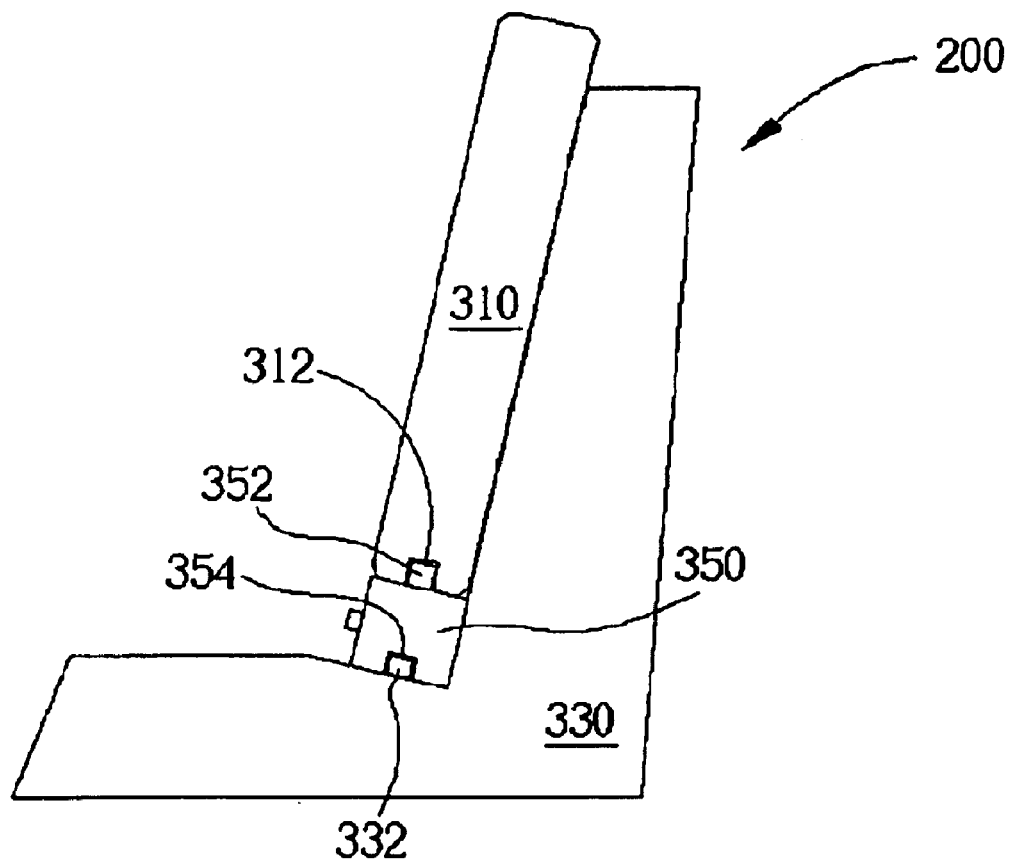
FIG. 7 is a perspective view of a second embodiment of the present invention composing PDA system.

Please refer to FIG. 7. FIG. 7 is a perspective view of a second embodiment of the present invention composing PDA system 300. Except for the peripheral module, the structure of the other components (the PDA and the cradle) of the composing PDA system 300 is the same as the prior art PDA system. The operation principle of the PDA system 300 is similar to the PDA system 200. Both the PDA system 200 and 300 forms a connection among the peripheral module, the cradle, and the PDA so that the function of the PDA can be extended through the peripheral circuit of the peripheral module. As shown in FIG. 7, the PDA 310 includes a first connecting port 312 installed on the lower side of the PDA 310. The upper side of the cradle 330 includes a first socket 332. The peripheral module 350 includes an upper socket 352 and a lower connecting port 354 respectively corresponding to the first connecting port 312 and the first socket 332. The lower connecting port 354 of the peripheral module 350 can be connected to the first socket 332 of the cradle 330 so as to fix the peripheral module 350 onto the cradle 330. The PDA 310 can be fixed on the peripheral module 350 by connecting the first connecting port 312 of the PDA 310 to the upper socket 352 of the peripheral module 350. Therefore, the PDA 310, the peripheral module 350, and the cradle 330 can electrically connect to each other. The PDA can not only be charged through the cradle 330, but can also input or output data through the peripheral module 350.

As mentioned above, the operation principle of the composing PDA system 300 is the same as the composing PDA system 200. Both the composing PDA system 200 and 300 are to make a connection among the peripheral module, the cradle, and the PDA, so that the function of the PDA can be extended through the peripheral circuit of the peripheral module. Since the structures of the present invention PDA and cradle are the same as the prior art PDA and cradle, manufacturers do not need to design and produce the PDA and cradle again, but can use the prior art PDA and cradle to fulfill the present invention PDA system. Therefore, users can extend the function of the PDA while using little expense. In addition, the PDA 310 is directly connected to the peripheral module 350 (without connecting through the cradle 330). Thus, even if the peripheral module 350 is not inserted into the cradle 330, the function of the PDA can still be extended through connecting to the peripheral module 350 only. In addition, the peripheral circuit (not shown) of the present invention peripheral module 350 further includes a power control function. When the peripheral module 350 is connected to the PDA 310, but does not connect to the cradle 330, the peripheral circuit controls the power transmission between the input/output port and the upper socket 352 (which is electrically connected to the PDA 310). If the input/output port is connected to a low-power-consumer device, such as the keyboard, the peripheral circuit allows the PDA 310 to provide electric power to the peripheral device. Conversely, if the input/output port of the peripheral module is connected to a high-power-consumer device, the peripheral circuit does not allow the PDA 310 to provide electric power to the peripheral device, so as to prevent a decrease in usable time of the PDA 310.

Figure 8:
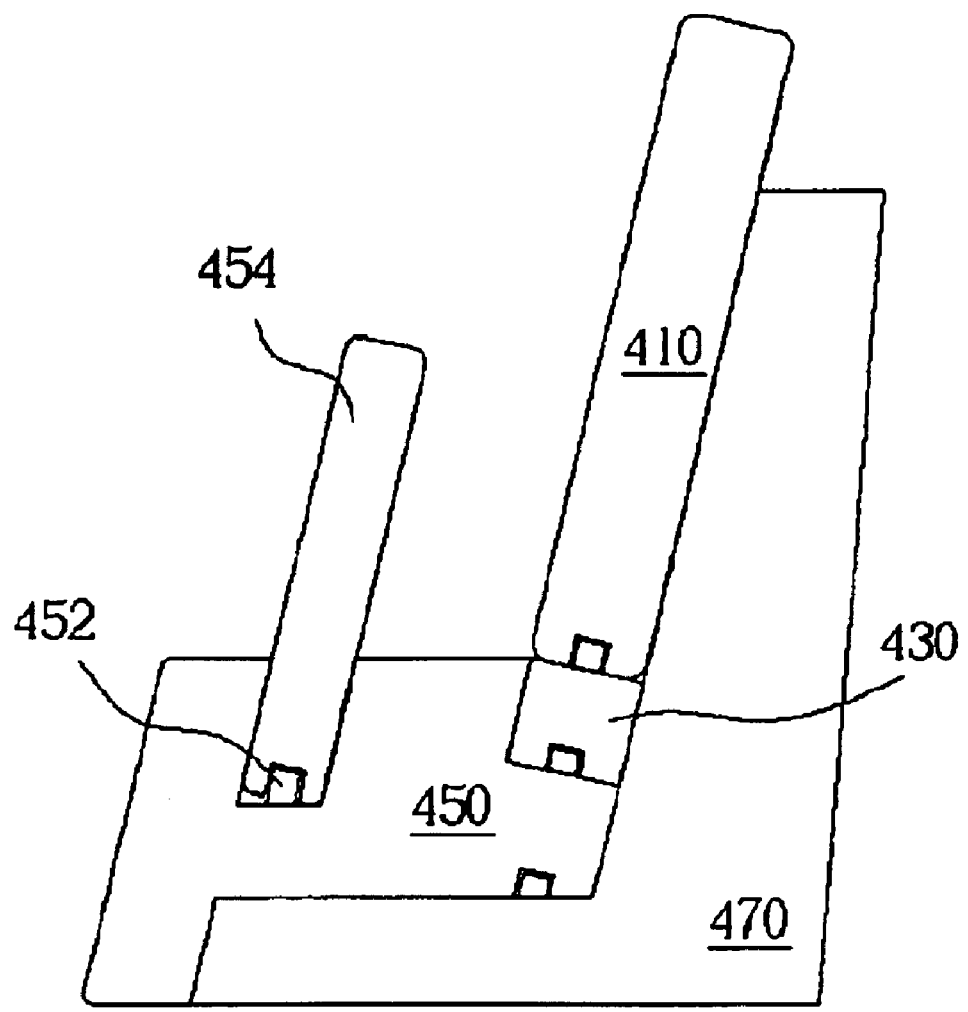
FIG. 8 is a perspective view of a third embodiment of the present invention composing PDA system.

In addition, the present invention composing PDA system is not limited to using only one peripheral module. The present invention PDA system can simultaneously connect with more than one peripheral module. Please refer to FIG. 8. FIG. 8 is a perspective view of a third embodiment of the present invention composing PDA system 400. As shown in FIG. 8, from top to bottom, the present invention composing PDA system 400 includes a PDA 410, a peripheral module 430, a peripheral module 450, and a cradle 470. All components of the PDA system 400 are electrically connected to each other through the corresponding connecting ports, sockets, and internal circuit inside each component. The peripheral module 450 is a charging module with a charging socket 452. The charging module can simultaneously charge a battery 454 and the peripheral module 430.

In contrast to the prior art PDA, the present invention composing PDA system electrically connects the PDA to the peripheral module. The PDA can use the peripheral function provided by the peripheral module so that the function of the PDA can be extended. The present invention composing PDA system has wide flexibility. Users can choose suitable components to arrange in groups so as to extend the function of the PDA and increase the convenience of the PDA. For example, when several users want to use an external peripheral device, in prior art PDA systems, each user must prepare a specific external add-on card or other connection device so as to use the peripheral device. However, the present invention composing PDA system only needs a peripheral module to satisfy all demands of users. The present invention PDA system makes the PDA more convenient for using. In addition, since the manufacturers do not need to design and produce the PDA and the cradle again, the cost can be decreased when users change from the prior art PDA to the present invention PDA system. Users can extend the functions of the PDA while using little expense.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A personal digital assistant system comprising:
   a personal digital assistant having a first connecting port for connecting to a cradle;
   a peripheral module for expanding functionality of the personal digital assistant, the peripheral module comprising:
      a socket for electrically connecting to the first connecting port;
      an input/output port for electrically connecting to a peripheral device; and
      a peripheral circuit electrically connected to the socket and the input/output port and comprising a power control function such that when the peripheral device requires less than a predetermined amount of electrical power, the peripheral circuit allows a connected personal digital assistant to provide power to the peripheral device and when the peripheral device requires at least the predetermined amount of electrical power, the peripheral circuit does not allow the connected personal digital assistant to provide power to the peripheral device.

2. The personal digital assistant system of claim 1 wherein in the peripheral module is a video graphics array module for outputting video signals.

3. The personal digital assistant system of claim 1 wherein the peripheral module is a network transmission module for transmitting network signals.

* * * * *